US009529904B2

(12) United States Patent
Anantharam et al.

(10) Patent No.: US 9,529,904 B2
(45) Date of Patent: Dec. 27, 2016

(54) UTILITY-BASED ONTOLOGY EVOLUTION (71) Applicant: International Business Machines Corporation, Armonk, NY (US)

(72) Inventors: Pramod Anantharam, Fairborn, OH (US); Biplav Srivastava, Noida (IN)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 13/920,130

(22) Filed: Jun. 18, 2013

(65) Prior Publication Data

US 2014/0372364 A1   Dec. 18, 2014

(51) Int. Cl.
*G06F 17/30* (2006.01)
*G06N 5/02* (2006.01)

(52) U.S. Cl.
CPC ......... *G06F 17/30734* (2013.01); *G06N 5/022* (2013.01)

(58) Field of Classification Search
None
See application file for complete search history.

(56) References Cited

U.S. PATENT DOCUMENTS

| 7,533,124 B2 | 5/2009 | Hellman et al. |
| 2008/0250020 A1 | 10/2008 | Madhavan |
| 2009/0094184 A1 | 4/2009 | Ross et al. |
| 2011/0078698 A1 | 3/2011 | Lee et al. |

FOREIGN PATENT DOCUMENTS

EP   2246810 A1   11/2010

OTHER PUBLICATIONS

Jøsang, Audun, Roslan Ismail, and Colin Boyd. "A survey of trust and reputation systems for online service provision." Decision support systems43.2 (2007): 618-644.*
Haase, P., and Y. Sure. "Incremental ontology evolution-evaluation." Sekt deliverable d3 1 (2005).*

(Continued)

*Primary Examiner* — Kakali Chaki
*Assistant Examiner* — Daniel Pellett
(74) *Attorney, Agent, or Firm* — Isaac J. Gooshaw (57) ABSTRACT

Exemplary embodiments of the present invention disclose a method, computer program product, and system for updating an ontology when a set of evidences and a set of constraints are given as inputs. Exemplary embodiments categorize concepts into three sets, a definitely relevant set, a possibly relevant set, and an irrelevant set. Exemplary embodiments store the concepts from the definitely relevant set in the ontology and the concepts from the possibly relevant set in a residual ontology. Exemplary embodiments match concepts in the set of evidences to the concepts in the ontology or the concepts in the residual ontology. Exemplary embodiments determine to enhance the strength of the existing concepts in the ontology or the existing concepts in the residual ontology. Exemplary embodiments determine to expand the ontology or the residual ontology. Exemplary embodiments remove the concepts from the ontology or the residual ontology utilizing the set of constraints.

20 Claims, 4 Drawing Sheets

(56) References Cited

OTHER PUBLICATIONS

Anantharam, Pramod, Biplav Srivastava, and Amit Sheth. "Utility-driven evolution recommender for a constrained ontology." Proceedings of the 3rd International Conference on Web Intelligence, Mining and Semantics. ACM, 2013.*
Djedidi et al. "Ontology Evolution: State of the Art and Future Directions," Computer Science Department, Supélec—Campus de Gif, 3 rue Joliot Curie, F- 91 192 Gif-sur-Yvette Cedex, France, Provided by searcher on Dec. 7, 2011. <http://perso.ecp.fr/—aufaurema/Ontology-Evolution.pdf>.
Fernandez et al. "Ontology Augmentation: Combining Semantic Web and Text Resources," K-CAP'11, Proceedings of the sixth international conference on Knowledge capture, Jun. 26-29, 2011, Banff, Alberta, Canada, Copyright 2010, ACM, 978-1-4503-0396-5/11/06.
Flouris, Giorgors. "On the Evolution of Ontological Signatures," ISTI-CNR Via G. Moruzzi, 1, 56124, Pisa, Italy. Provided by searcher on Dec. 7, 2011, pp. 67-72, <http://bis.kie.ae.poznan.pl/10th_bis/one_proceedings.pdf>.
Gabrilovich et al. "Computing Semantic Relatedness using Wikipedia-based Explicit Semantic Analysis," Department of Computer Science, Technion—Israel Institute of Technology, 32000 Haifa, Israel, <http://www.cs.technion.ac.il/~gabr/papers/ijcai-2007-sim.pdf>.
Haase et al. "D3.1.2 Incretmental Ontology Evolution—Evaluation," Document ID: SEKT/2005/D3.1.2/v1.0, Project: SEKT EU-IST-2003-506826, Nov. 2, 2005, © 2006 Institute AIFB, University of Karlsruhe.
Seung Hwan Kang. "Ontology revision on the semantic web: integration of belief revision theory," University of Wollongong Theses Collection, 2007, pp. 1-108, <http://ro.uow.edu.au/theses/62>.
Packer et al. "An On-Line Algorithm for Semantic Forgetting", Proceedings of the Twenty-Second International Joint Conference on Artificial Intelligence, pp. 2704-2709.
Sun et al. "The Ontology Revision," Key Laboratory of Intelligent Information Processing Institute of Computing Technology, Chinese Academy of Sciences, China, Provided by searcher on Dec. 7, 2011, <http://www.ijcai.org/papers/post-0201.pdf>.
Yang et al. "Efficient Searching Top-k Semantic Similar Words," Proceedings of the Twenty-Second International Joint Conference on Artificial Intelligence, pp. 2373-2378.
Wang et al. "Forgetting Concepts in DL-Lite," S. Bechhofer et al.(Eds.): ESWC 2008, LNCS 5021, pp. 245-257, 2008, © Springer-Verlag Berlin Heidelberg 2008, http://www/nlm.nih.gov/research/umls.
Zablith et al. (2009) "Ontology Evolution with Evolva," ESWC 2009, LNCS 5554, pp. 908-912, 2009, Copyright Springer-Verlag, Berlin, Heidelberg 2009, <http://fouad.zablith.org/docs/ESWC2009Demo.pdf>.

* cited by examiner

UTILITY-BASED ONTOLOGY EVOLUTION

FIELD OF THE INVENTION

The present invention relates generally to the field of ontology, and more particularly to utility-based ontology evolution.

BACKGROUND OF THE INVENTION

For a sustainable semantic web, ontology building and maintenance should be made as simple as possible. Semantic Web has proliferated into various dynamic domains. In these domains, the notion of a concept may change over time, or there may be new concepts in the domains, that are not captured in the older ontology. With constantly changing domain knowledge, there is a need for domain experts to keep the ontology updated, with the changes, in the domain. Often, the domain experts are inundated with so much information that it can be extremely difficult to keep up with the pace of domain changes. Even if domain experts keep up with the domain changes, there are increasingly many such dynamic domains being modeled in the form of an ontology, and it is a significant burden on the domain experts to update the ontology in a timely fashion.

As open data efforts like Linked Open Data (LOD) continues at a rapid pace, more domains would be part of LOD. Most importantly, there will be a need to keep this data updated with the continuous domain changes such that the data is representative of the domain of discourse. While a continuous effort has been made to understanding the evolution of ontology, what has not become clear is how to answer a question that is formed during the update of an ontology.

SUMMARY

Embodiments of the present invention disclose a method, computer program product, and system for updating an ontology when a set of evidences and a set of constraints are given as inputs. Exemplary embodiments categorize one or more new concepts included in a set of evidences into one of three sets, a) a definitely relevant set, b) a possibly relevant set, and c) an irrelevant set. Exemplary embodiments add a categorized new concept included in the definitely relevant set to an first ontology. Exemplary embodiments add a categorized new concept included in the possibly relevant set to a residual ontology. Exemplary embodiments match one or more new concepts included in the set of evidences to an old concept included in the first ontology or to an old concept included in the residual ontology, wherein an old concept existed as part of the first ontology or the residual ontology before the respective addition of the new concepts to the first ontology or the residual ontology. Exemplary embodiments determine to increase an associated confidence measure of the old concept, included in the first ontology or the residual ontology, based at least in part, on the matching. Exemplary embodiments determine to expand the first ontology or the residual ontology by respectively adding one or more new concepts to the first ontology or the residual ontology. Exemplary embodiments remove one or more old concepts from the first ontology or the residual ontology based, at least in part, on a set of constraints, wherein the constraints dictate size and performance requirements of the first ontology.

DETAILED DESCRIPTION

An ontology by definition is a formal representation of concepts in a domain of discourse. A practical question which comes up is how large an ontology should be. There are typically two main concerns. First, an increase in ontology size will make inferences on the ontology slow. So, in response, real-world applications may impose constraints on the size of ontology like the number of concepts. Second, the ontology should have concepts that someone, e.g., consumers, care about. As concepts go out of vogue over time, and may come back in later, the ontology should be a representative view of what concepts someone looks for. If an ontology addresses the two concerns, i.e., ontology size and what is being looked for, not only will the ontology's size be small enough to provide good performance, but also have content that satisfies those who use that ontology. The combination of efficiency and effectiveness would make the ontology valuable to the users of the ontology. To achieve this, exemplary embodiments consider a set of concepts in the domain to fall into one of three categories: (a) highly relevant, (b) possibly relevant, or (c) irrelevant. Highly relevant concepts are kept in the ontology (O), while possibly relevant concepts are kept in the residual ontology (O-residual), and the irrelevant concepts are not included. A concept may start in one category and over time, drift into another category. For example, the concept of a computer has been around for over 50 years. Associated concepts of 1950's like thin computing had lost relevance by the time thick computing came about during the 1980s, but thin computing re-emerged again starting in the 1990's. Further, the ontology (O) and residual ontology (O-residual) have additional constraints to ensure that their performance is bounded.

Exemplary embodiments take a least-commitment approach to handling an evidence in the context of the ontology. The evidence-concept is checked with the ontology and in case the evidence-concept is new and the ontology constraints allow for expansion, the evidence is included. If the ontology (O) constraints do not allow for expansion, but the residual ontology (O-residual) constraints allow expansion, then the evidence is still included. In the scenario where the constraints of both the ontology (O) and the residual ontology (O-residual) do not allow for expansion, then a benefit-cost analysis is performed for the full formal representation and at least one concept is removed (from ontology or evidence). The ontology size remains bounded and the concepts in the ontology are still relevant.

If no evidences are identified, then a benefit-cost analysis is still performed periodically to ensure that the concepts in the ontology (O) and the residual ontology (O-residual) remain relevant.

As sustainable model for updating ontology and maintaining the ontology is yet to be realized by known techniques. Exemplary embodiments of the present invention address the problem of keeping an ontology up to date with the changes in a given domain by using a utility-driven method for adding and removing concepts from the ontology, guided by constraints placed on the ontology. Exemplary embodiments define the notion of concept utility and ontology constraints, to provide a principled approach for ontology evolution. Exemplary embodiments may use different forms of evolution methods, such as, knowledge based methods for finding matches and arranging terms in an ontology (e.g. WordNet, Wikipedia). Other embodiments may use corpus based methods that utilize the statistical analysis of a corpus of knowledge for finding related terms for ontology evolution. Other embodiments may use string based techniques to arrange concepts in an ontology (e.g. edit-distance, MongeElken Distance). Other embodiments may use logic based methods by using logical statements for representation and evolution of a knowledge base. Some exemplary embodiments use both logic and string based methods, combined with utility and constraint based decision making.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
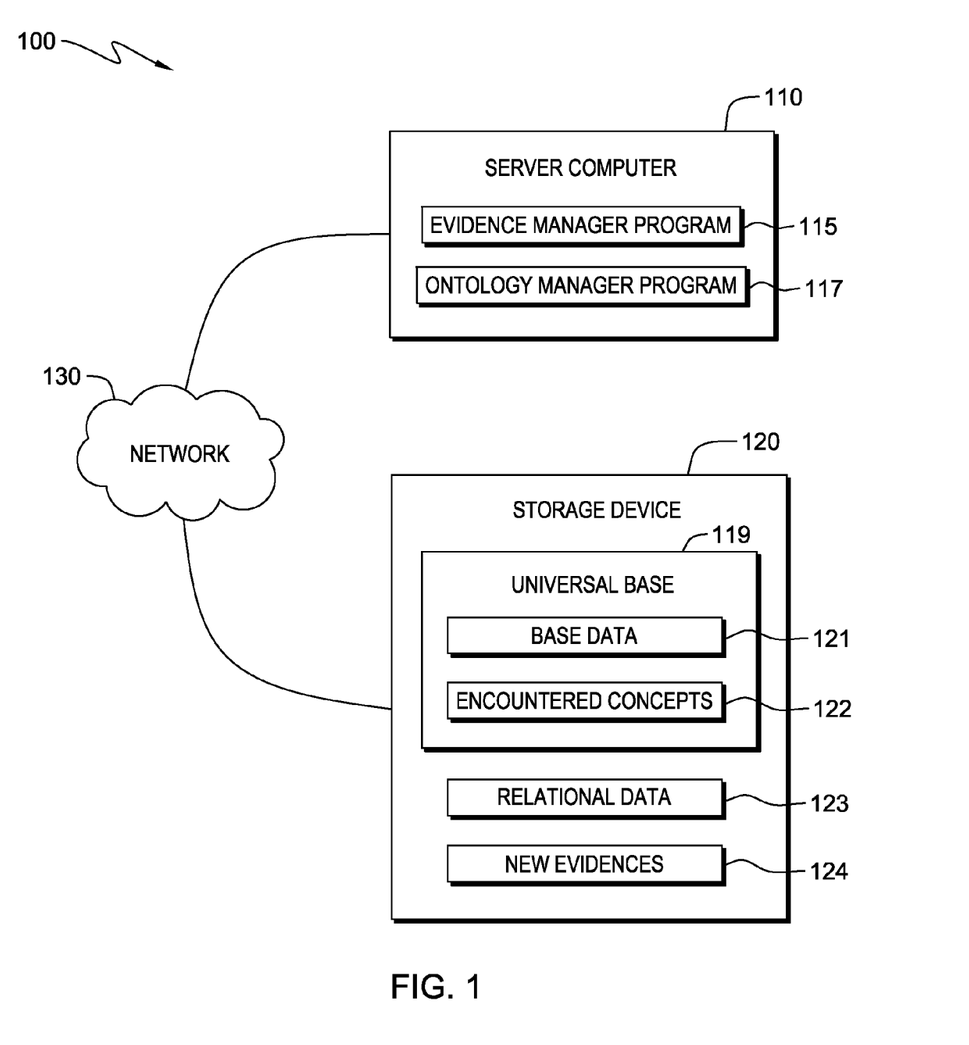
FIG. 1 is a block diagram illustrating an ontology evolution environment, in accordance with an embodiment of the present invention.

The present invention will now be described in detail with reference to the Figures. FIG. 1 is a functional block diagram illustrating an ontology evolution environment, generally designated 100, in accordance with one embodiment of the present invention.

Ontology evolution environment 100 includes server computer 110 and storage device 120 interconnected over network 130.

In various embodiments of the present invention, storage device 120 is a data storage device in communication with server computer 110. In general, storage device 120 is a data storage device used to store data, such as the data included universal base 119, base data 121, encountered concepts 122, relational data 123, and new evidences 124. Typically, the data included universal base 119, base data 121, encountered concepts 122, relational data 123, and new evidences 124 is accessed as needed by server computer 110 via network 130. In some embodiments, storage device 120 is integral with computing device 110. In some embodiments of the present invention, storage device 120 is a computing device that can be a standalone device, a server, a laptop computer, a tablet computer, a netbook computer, a personal computer (PC), or a desktop computer. In another embodiment, storage device 120 represents a computing system utilizing clustered computers and components to act as a single pool of seamless resources. In general, storage device 120 can be any computing device or a combination of devices with access to the data included in universal base 119, base data 121, encountered concepts 122, relational data 123, and new evidences 124, and that is capable of sending, via network 130, the information included in universal base 119, base data 121, encountered concepts 122, relational data 123, and new evidences 124 to computing device 110. Storage device 120 may include internal and external hardware components, as depicted and described in further detail with respect to FIG. 4.

Server computer 110 may be a laptop computer, tablet computer, netbook computer, personal computer (PC), a desktop computer, a personal digital assistant (PDA), a smart phone, or any programmable electronic device capable of communicating with storage device 120 via network 130. Network 130 can be, for example, a local area network (LAN), a wide area network (WAN) such as the Internet, or a combination of the two, and can include wired, wireless, or fiber optic connections. In general, network 130 can be any combination of connections and protocols that will support communications between server computer 110 and storage device 120.

Server computer 110 includes evidence manager program 115 and ontology manager program 117. Evidence manager program 115 updates the ontology first and then the residual concepts in a universal base. Ontology manager program 117 removes or adds concepts to the ontology based on confidence scores (measures) associated with the concepts in the universal base stored in storage device 120. In certain embodiments the functions of both evidence manager program 115 and ontology manager program 117 are included in a single program.

Evidence manager program 115 may use techniques such as Monge Elken Distance and matching related terms associated with the incoming evidences, included in new evidences 124, and the terms associated with the concepts in the ontology. Evidence manager program accesses base data 121 and encountered concepts 122, (included in universal base 119 of storage device 120), which respectively include an ontology (O) and an O-residual. The incoming evidences are processed by evidence manager program 115 sequentially. Every evidence is processed using a label and associated terms to each evidence, comparing them against labels and terms associated with all the concepts in the ontology, which is then stored as part of relational data 123, also included in storage device 120. Evidence manager program 115 may use further techniques to enhance the quality of evidence accumulation. In exemplary embodiments, evidence manager program 115 may perform the following functions: (i) computing relatedness of incoming evidence to the existing concepts in the ontology; (ii) combining relatedness scores of various techniques into a single confidence measure; (iii) deciding on expanding the O-residual knowledge base depending on the nature of incoming evidence; and (iv) decaying the confidence measures of all the unused concepts in the ontology.

More techniques can be added as part of the evidence accumulation process provided there is a known way to redistribute the weights among all the different techniques of evidence accumulation. Overall, the restrictions on the relationships may facilitate the accumulation of evidence toward a particular type of relationship to be added to the knowledge base. In terms of concept utility being tracked over time, an exponential decay of confidence scores associated with the unused concepts can be extended to include the usage of a given concept during a period of time, and the cost associated with relearning the concept. Generally, concept usage and relearning cost would be considered before removing a concept from the ontology.

In exemplary embodiments, there may be some desired accumulation processes for the ontology evolution. In exemplary embodiments, incoming evidence can be a positive or a negative evidence towards a concept already present in the ontology. In some situations, abrupt changes to the ontology may not be desirable. In other situations and embodiments, the initialization of support values may not be intuitive. Further, the support values may not be normalized, in certain instances and embodiments, to facilitate the comparison of support values associated with different concepts.

For evidence accumulation, exemplary embodiments may use beta distribution functions to facilitate a framework for evidence accumulation. Beta distribution functions may facilitate the framework for evidence accumulation because beta distribution functions have the properties of: a) having two shape parameters, $\alpha$ and $\beta$, where $\alpha$ counts the number of positive evidences and $\beta$ counts the number of negative evidence; b) having a gradual change in the mean and variance of a beta distribution; c) having a support value that can be initialized such that, all concepts are equally likely to be in the ontology; and d) having support values (e.g. mean of the distribution) that are comparable since they range between zero and one.

Exemplary embodiments of the ontology evolution environment accepts evidences in a variety of forms. For example, an evidence can be a single term or a hierarchy of terms in a subsumption relationship. Incoming evidences can be general or specific in nature. For example, evidence "traffic" is generally compared to "traffic management". Similarly, "department" is generally compared to "police department." Typically, general concepts appear more often than specific concepts. Based on this principle, exemplary embodiments may provide the desirable property of concept support. In concept support, the more general concepts included in a hierarchy would have more support than the more specific concepts included in the hierarchy, which would have comparatively less support.

In exemplary embodiments, when an incoming evidence matches a specific concept or a general concept, the incoming evidence strengthens the support associated with the concept in the ontology. The representation of support for a concept is such that it is expressive enough to capture positive and negative evidence, and explanations for each update of support. Typically, a simple numerical value is not sufficient to convey the need information and hence, exemplary embodiments use a special representation to capture all the aspects of support representation and to update the ontology.

In exemplary embodiments, more specific concepts may provide evidence for the more general concepts e.g., "traffic management" provides evidence to "traffic". Conversely, more general concepts may not provide evidence to more specific concepts e.g., the presence of "department" may not provide evidence for "police department". In exemplary embodiments, propagating from more specific concepts to more general concepts may strengthen the evidence. For example, when an evidence is found that supports a specific concept, then the support for that concept's association with the ontology is increased. In some instances there may be super classes of this specific concept. For example, there may be a desire to answer a question before performing an update to the included support information. For example, a question such as "should there be an increase in the support for all the super classes?" could be asked. Other questions may include "How much support should we increase?", and "Should the increase in support be the same for all the super classes?". In exemplary embodiments, considering that every evidence can affect the evidence accumulation by a unit, the weight is spread across all the super classes equally. For example, after the support is increased for the matching concept, e.g., if "ej" matches with "ci", and "C", then the support for "ci" and "C" each increase by one. However, if there are ten super classes of "ci" in "C", then the weight increases each of these "ci" concepts by $1/10$.

In exemplary embodiments, the incoming evidences are in the form of concepts, associated terms and support strength. The focus is placed on incoming concepts, which are used to update the ontology concepts based on the accumulated support strength. Support strength is computed based on the incoming evidences, and is updated during the processing of those incoming evidences. In exemplary embodiments, the general evidence accumulation process may apply to properties in the ontology as well. For example, the representation of such an evidence can be in the form of subject-relation-object triples. Exemplary embodiments introduce the idea of constraint driven ontology evolution, which provides the guidelines for the addition and removal of concepts from an ontology. Constraints often play a crucial role in maintaining quality and usability of a given ontology. Therefore, in exemplary embodiments, the notion of explaining the changes made to an ontology is introduced. The explanation allows exemplary embodiments to not only justify the reasons for ontology change, but also provides a way to compare the various reasons for change in the ontology, thereby providing new insights into ontology evolution in the domain.

Ontology manager program 117 is responsible for implementing changes to the ontology based on the accumulated evidences. In exemplary embodiments, there are four actions that can be taken by the ontology manager: (i) adding concepts to O-residual (ii) removing concepts from O-residual to accommodate new concepts with better confidence measures; (iii) removing concepts from ontology (O) and moving the concepts to O-residual and vice-versa; and (iv) ignoring. The confidence measure associated with each concept in ontology (O) and O-residual decides if the concept would continue to stay in the ontology or would be moved to the residual ontology, or if any concept from the residual ontology would be moved to the ontology. There is no increase or decrease in the number of concepts as a whole but there may be changes in the number of concepts that may stay in the ontology or being moved to the residual ontology and vice-versa.

Exemplary embodiments of storage device 120 includes, in general, data relating universal base data to concepts that are encountered until the evolution occurs. In this embodiment, universal base 119 includes base data 122 and encountered concepts 122. Universal base 119 includes concepts that have already been encountered and processed. Base data 122 includes an ontology (O) that is under evolution. Encountered concepts 122 includes residual ontology (O-residual), i.e., the probable and relevant concepts to be added to the ontology (O). Relational data 123 includes data that shows the relationship between the various pieces of information included in base data 121 and encountered concepts 122. Storage device 120 also includes new evidences 124. New evidences 124 includes evidences that have not yet been processed by evidence manager program 115 or ontology manager program 117. Storage device 120 may be any type of storage device capable of storing data that is accessible by evidence manager program 115 and ontology manager program 117. Although one storage device is depicted in this example, any number of separate storage devices may be used.

Exemplary embodiments of the present invention recognize that a principled way of changing the ontology may be accomplished, based at least in part on the evidences seen, on the constraints in place about size and performance of the ontology, and based on benefit-cost analysis of ontological change. Exemplary embodiments of the present invention provide an explanation of change and maintain traceability to the evidences that caused the change to the ontology.

Figure 2:
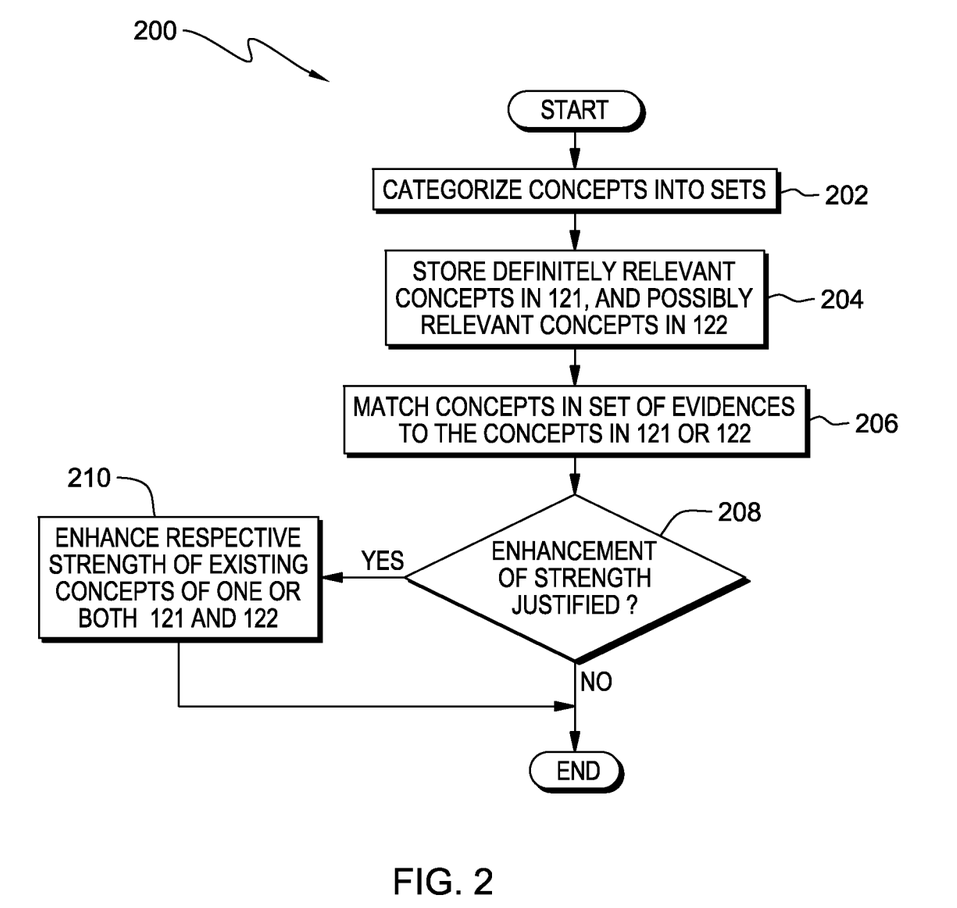
FIG. 2 is a flowchart depicting operational steps of an evidence manager program, within the data processing environment of FIG. 1, for updating the ontology and the residual concepts in the universal base.

FIG. 2 is a flow diagram, 200, illustrating the operational steps utilized by evidence manager program 115 to update an ontology and residual concepts respectively included in a universal base, in accordance with an embodiment of the present invention. In step 202, evidence manager program 115 categorizes concepts into three sets, a definitely relevant set, a possibly relevant set and an irrelevant set. In step 204, evidence manager program 115 stores concepts from the definitely relevant set in the ontology and concepts from the possibly relevant set in a residual ontology. In step 206, evidence manager program 115 matches concepts in the set of evidences to the concepts in the ontology or the residual ontology. In decision step 208, evidence manager program 115 determines if enhancement of the strength of the existing concepts in the ontology or the residual ontology is justified. If evidence manager program 115 determines that enhancement of the strength of the existing concepts in the ontology or the residual ontology is justified (decision step 208, yes branch), then evidence manager program 115 enhances the strength of the existing concepts in one or both of the ontology (121) and the residual ontology (122) accordingly, in step 210 and then finishes execution, i.e. ends. If evidence manager program 115 determines that enhancement of the strength of the existing concepts in the ontology or the residual ontology is not justified (decision step 208, no branch), then evidence manager program 115 finishes execution.

Figure 3:
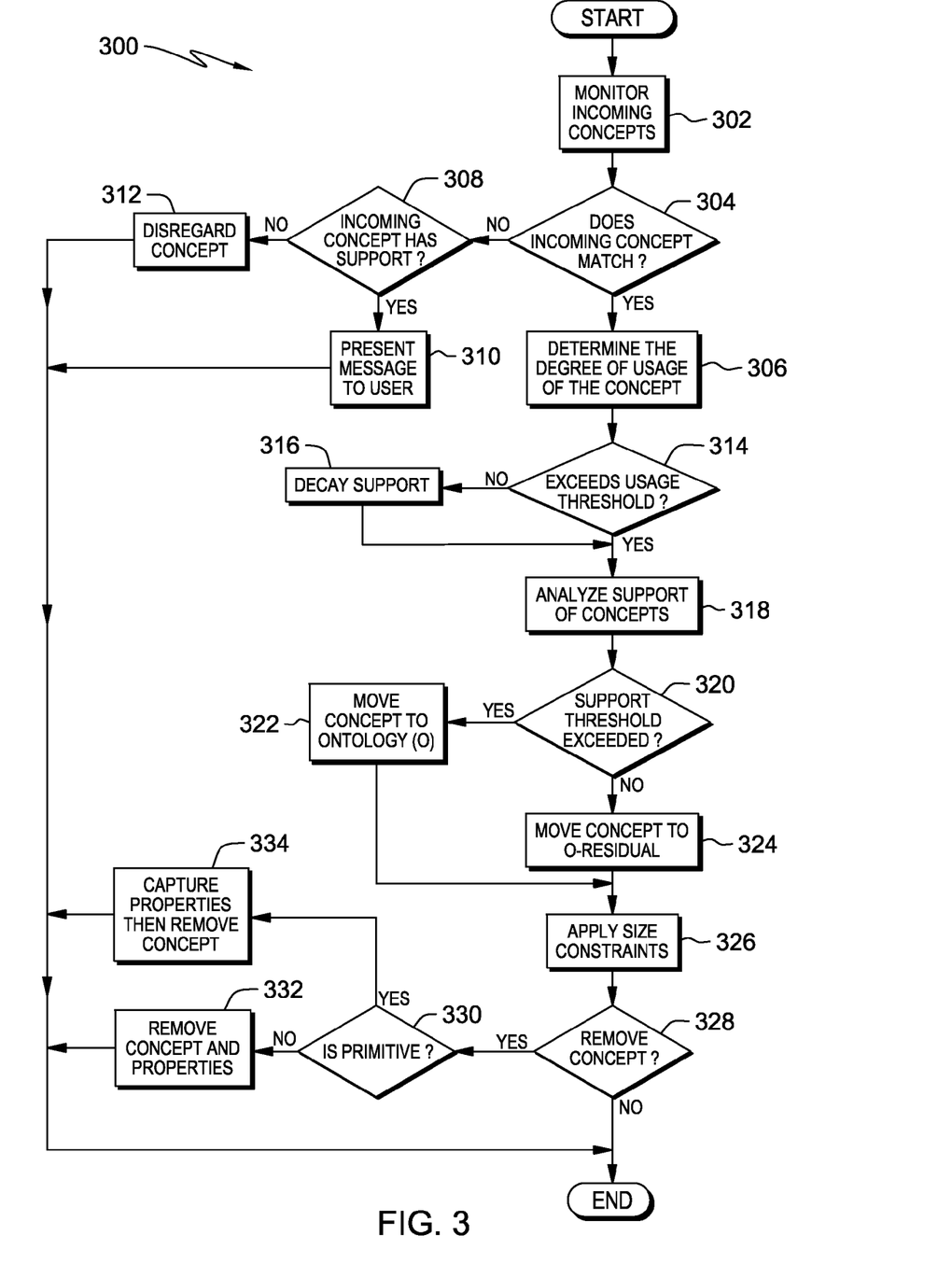
FIG. 3 is a flowchart depicting operational steps of an ontology manager program, within the data processing environment of FIG. 1, for managing concepts within the ontology.

FIG. 3 is a flow diagram, 300, illustrating the operational steps executed by ontology manager program 117 for removing or adding concepts to the ontology based on confidence scores associated with the concepts in the universal base, according to one embodiment of the present invention. Every concept in the ontology (O) and O-residual has an associated support information. Every incoming evidence, included in new evidences 124, may cause concepts in ontology (O), 121, and O-residual, 122, to gain or lose support accordingly.

In step 302, ontology manager program 117 monitors, and identifies, incoming concepts. Ontology manager program 117 contacts storage device 120 and accesses the information, e.g., un-processed "new" concepts, included in new evidences 124. Then, in decision step 304, ontology manager program 117 determines if the identified incoming concept matches an existing concept included in the ontology (O) or the residual ontology (O-residual), included in base data 121 and encountered concepts 122 respectively. There may be special condition where a given incoming evidence, from new evidences 124, does not match any of the existing concepts in ontology (O), included in base data 121. In such a circumstance, there may also be many incoming evidences that strengthen the support of that new evidence. Since there are no matching concepts for this new evidence in the existing ontology (O), the ontology is not automatically extended with this new concept. However that new concept will be presented as a suggestion to the human ontology user as a possible extension. Therefore, if the incoming concept does not match an existing concept (decision step 304, no branch), then ontology manager program 117 determines if the incoming concept has support, in decision step 308. If ontology manager program 117 determines that the incoming concept has support (decision step 308, yes branch), then ontology manager program 117 presents a message identifying that the incoming concept may be of value, in step 310. If ontology manager program 117 determines that the incoming concept does not have support (decision step 308, no branch), then ontology manager program 117 disregards that concept, in step 312.

If the incoming concept did match an existing concept (decision step 304, yes branch), then ontology manager program 117 determines the degree of usage of the concept, in step 306. Ontology utility manager 117 tracks the frequency of use of concepts that are not being used over a period of ontology evolution and decays unused concepts' support of and association with the ontology. Ontology manager program 117 analyzes the support information associated with each of the concept in O and O-residual and moves those concepts with lower support out of O. If the support of a concept in O-residual, 122, is strong, it will be moved to ontology (O), 121. Therefore, in decision step 314 ontology manager program 117 determines if the usage of the concept exceeds a usage threshold. If the usage of the concept does exceed the usage threshold (decision step 314, yes branch), then ontology manager program 117 proceeds to step 318. If the usage of the concept does not exceed the usage threshold (decision step 314, no branch), then ontology manager program 117 decays the level of support for that concept, in step 316.

In step 318, ontology manager program 117 analyzes the support for the various concepts. Then, in decision step 320, ontology manager program 117 determines if a support threshold for a given concept has been exceeded. If the level of support for a given concept exceeds the threshold (decision step 320, yes branch), then ontology manager program 117 moves that concept to ontology (O), in step 322. If the level of support for a given concept does not exceed the threshold (decision step 320, no branch), then ontology manager program 117 moves that concept to residual ontology (O-residual), in step 324.

In step 326, ontology manager program 117 applies size constraints. Over the evidence accumulation during ontology evolution there may be situations were a concept may not be used frequently. It may be due to it's (i) Reduced importance in the domain (ii) Concept has reached its stable state. To distinguish between these two possible cases, we use the propagation of evidences from the children to all its ancestors. Thus, evidence received for a concept in the leaf part of the ontology will not only strengthen it's support but also strengthen support of all its super classes. Concept support reduction can be done based on various measures depending on the one that can best explain when a concept in a domain has lost it's significance. Support for a set of concepts can be reduced if the incoming evidences do not provide evidence for these concepts. This can be based on (1) number of evidences being processed—for every set of incoming evidences, we can look for concepts for which the evidence did not arrive, (2) the time interval—a fixed time interval can be used to reduce the support, (3) number of changes happened to the ontology—concepts unused for a specific number of changes done to the ontology. While we decay support for concepts that are not being used, we may end up with concepts in the ontology with support values lower than the threshold. In such a case, we need to remove concepts from the ontology. Therefore, in decision step 328, ontology manager program 117 determines if a given concept should be removed.

In the known art, most of the work on concept removal is done on DL knowledge bases. The focus of such works is on consistency of the knowledge base while exemplary embodiments remove some concepts from the ontology. It is known that concept removal cannot be expressed in the same language like in case of OWL-Lite. In exemplary embodiments, there is a T-box component A C-B in a knowledge base, and A-Box A(a) in the same knowledge base. If exemplary embodiments have to remove A(a) from the knowledge base, then the exemplary embodiments need to capture that 'a' is not a member of B which is implicit by the T-box component of the knowledge base. This is not expressible in OWL-Lite, which is argued to be fine since any query on the ontology would need membership information as opposed to non-membership information. The removal mechanism depends on the extent of support materialization we do with the concepts in the ontology. The support information may be stored as instances of the concepts being added to the ontology. In this case, when concepts are removed, the associated instances must be addressed by moving them to appropriate class membership. If instance information is not stored beyond the existence of concept in the ontology, i.e. if all the support is removed when a concept is removed, then the support information is not persistent and hence need not be maintained. A concept may have associated properties and removal of a concept would result in loss of this information as well.

Considering the alternative of materializing all the properties of a class before removal, assuming that the same concept may appear in future and it would have the same set of properties is a unreasonable assumption. Also, assuming that the concept name would remain unchanged over a period of time in a domain is also unreasonable. Hence, a clean removal is performed, i.e. both the concept and the relationships associated with the concept are removed from the ontology. A clean removal does not rely on or imply assumptions regarding the concept's name and properties. Conversely, if there are primitive concepts in a domain that may remain unchanged, then the properties of those primitive concepts can be captured before removal of the concepts. These captured properties if materialized, can be used at a later stage to retrieve all the properties assuming that the concept being removed now, may be added back to the ontology at a later stage. Over a period of time, if there are changes in properties of a concept in a domain, then the consistency of the properties materialized may be altered. However, if the consistency can be guaranteed, then materializing and retrieval of concepts could be beneficial. Therefore, if ontology manager program 117 determines to remove a concept (decision step 328, yes branch), then ontology manager program 117 determines if the concept to be removed is a primitive concept, in decision step 330. If the concept to be removed is not primitive (decision step 330, no branch), then ontology manager program 117 removes the concept and the associated properties, in step 332. If the concept to be removed is primitive (decision step 330, yes branch), then ontology manager program 117 captures the properties of that concept and saves them, as part of relational data 123, before removing the concept.

In exemplary embodiments, an ontology consists of concepts and relationships between the concepts in the form of properties, which may have restrictions in terms of domain and range. Constraints can be categorized as semantic constraints (e.g. property restrictions) or size constraints (e.g. number of concepts in the ontology). These constraints act as guidelines for ontology evolution. O is the ontology under evolution, and $O_{residual}$ is the ontology with concepts and relationships having insufficient support information. Both O and $O_{residual}$ are part of the universal base, and therefore, $O \cup O_{residual} \subset U$. Also, $O \cap O_{residual} = \emptyset$. In exemplary embodiments, O is referred to as the ontology, $O_{residual}$ represents the residual ontology and U represents the universal base, each of which are defined hereafter.

In exemplary embodiments, $O=[C, R, K_O]$ where, $C=\{c_1, c_2, \ldots, c_n\}$ are the concepts in the ontology, $R=\{r_1, r_2, \ldots, r_m\}$ are the relationships in the ontology, and $K_O$ are the contains. $K_O$ for instance may contain, $|C| \leq n$ and $|R| \leq m$ where, n, m∈N are the constraints on the number of concepts and relationships in the ontology. Similarly, $O_{residual}=[C_{residual}, R_{residual}, K_{residual}]$, where, $C_{residual}=\{c_1, c_2, \ldots, c_n\}$, $R_{residual}=\{r_1, r_2, \ldots r_m\}$ and $K_{residual}$ are for example $|C_{residual}| \leq n$ and $|R_{residual}| \leq m$ where n, m∈N are the constraints on the number of concepts and relationships in the residual base. f $U=[C_u, R_u, K_u]$ is a universe containing all the domains and exemplary embodiments model a domain of discourse as shown in FIG. 1, then the following relations hold: $C \cup C_{residual} \subset C_u$, $R \cup R_{residual} \subset R_u$, and $K_O \cup K_{residual} \subset K_u$.

Exemplary embodiments may use the following notations and illustration in following example(s) herein, as shown in tables 1 and 2 respectively:

TABLE 1

Notations and illustration of the ontology under evolution

| Terminology | Example |
|---|---|
| $O = [C, R, K_O]$ | $C = \{c_1, c_2, c_3\}$ where, $c_1$ = <PublicUtilityService, { }, {α = 0, β = 0}> $c_2$ = <WaterService, { }, {α = 0, β = 0}> $c_3$ = <WaterDistributionService, { }, {α = 0, β = 0}> |
| R | R = {<$c_2$, $c_1$, subClassOf>, <$c_3$, $c_2$, subClassOf>} |
| $K_O$ | $K_O$ = {$N_c$ ≤ 5} |
| $O_{residual}$ = [Cr, Rr, Kr] | $C_{residual}$ = ∅ |
| $R_{residual}$ | $R_{residual}$ = ∅ |
| $K_{residual}$ | $K_{residual}$ = {$N_c$ ≤ 5} |

TABLE 2

$E_{incoming}$ containing all the incoming evidences to be processed

| $E_{incoming}$ = $\{e_1, e_2, e_3, e_4\}$ | $e_1$ = <WaterTreatmentService, { }, {α = 0, β = 0}> $e_2$ = <WaterTreatment, { }, {α = 0, β = 0}> $e_3$ = <WaterTreatmentPlant, { }, {α = 0, β = 0}> $e_4$ = <WaterBillingService, { }, {α = 0, β = 0}> |
|---|---|

Where $W_{terms}, c_i = \{w_{terms}, c_1, w_{terms}, c_2, \ldots, w_{terms}, c_m\}$ represents the terms associated with each concept, where m represents the total number of concepts in O and $O_{residual}$. $E_{incoming} = \{e_1, e_2, \ldots e_k\}$ represents the incoming evidences to be analyzed by the ontology evolution process. $W_{terms}, e_i = \{w_{terms}, e_1, w_{terms}, e_2, \ldots w_{terms}, e_k\}$ represents the set of terms associated with the incoming evidence. Every evidence is of the form $e_i = <e_{label}, w_{terms}, e_i, s>$. Every concept $c_i \in C_u$, has the form $c_i <c_{label}, w_{terms}, c_i, s>$ where $c_{label}$ is the name of the concept (textual representation of the concept), $w_{terms}, c_i$ is a set of terms associated with the concept $c_i$, and s is the support information associated with the concept for the inclusion in the ontology (O).

This section describes algorithms used by the ontology evolution process. Algorithms described here are pretty generic and it can be used as a general approach for any ontology evolution task. After describing each algorithm, we will show the processing of evidence $e_1$ from Table 2. Rest of the evidence processing is shown at the end of this section. In table 3, Algorithm 1 is a high level function that shows the ontology evolution process at an abstract level. This invokes either TryOntologySupportUpdate if there are matching concepts in the ontology or TryOntologyExpansion if there are no matching concepts in the ontology with the incoming evidence. $\phi_m$ refers to the match threshold used by the matching function Match ( ) supplied by the argument.

TABLE 3

Algorithm 1 UtilityDrivenOntologyEvolver(O, Eincoming, Match( ))

Require: O, $E_{incoming}$, Match( ), $\phi_m$, $\theta_o$
Ensure: Evolved ontology $O_{out}$.
1: Global $O_{residual}$ = { }
2: for For every incoming evidence, $e_j \in E_{incoming}$ do
3: if Match($e_j$ , $c_i$) $c_i \in$ C ∨ Match($e_j$ , $c_i$) $c_i \in$ Cresidual then
4: TryOntologySupportUpdate(O, $e_j$ , Match( ))
5: else
6: TryOntologyExpansion(O, $e_j$ , Match( ))
7: end if
8: end for
9: // Periodically call these two functions 10: UpdateOntology(U,$\theta_o$ )
11: ManageUtilityOfConcepts(U,$E_{incoming}$)

Since $e_1$=<WaterTreatmentService, { }, {α=0, β=0}>doesn't match completely with any concept in the ontology, and since the constraints allow for expansion of the ontology, TryOntologyExpansion is invoked with $e_1$, ontology and the match function.

In table 4, Algorithm 2 is invoked for each incoming evidence by Algo-rithm 1. This algorithm invokes supportUpdate on C and $C_{residual}$. This function would eliminate the repetition of the two loops for traversing through the concepts in O and $O_{residual}$.

TABLE 4

Algorithm 2 TryOntologySupportUpdate(O, $e_j$ , Match( ))

Require: U, $\phi_m$
Ensure: Invoke supportUpdate on C and $C_{residual}$.
1: SupportUpdate($e_j$ , C)
2: SupportUpdate($e_j$ , Cresidual)

In table 5, Algorithm 3 is used to process incoming evidence by updating the support information associated with each matching concept in the ontology. This algorithm is generic and works on any evidence and ontology supplied as an argument.

TABLE 5

Algorithm 3 SupportUpdate($e_j$, C)

Require: $\phi_m$
Ensure: $\forall c_i = <c_{label}, w_{terms}, c_i , s> \in C_u$, update s, where s is
the support information associated with it's inclusion in the ontology, O.
1: for For every $c_i \in C$ do
2: if Match($e_j$ , $c_i$) $c_i \in C$ then
3: update s in $c_i = <c_{label}, w_{terms}, c_i , s>$
4: end if In table 6, Algorithm 4 is invoked by Algorithm 1 if there are no matching concepts in the ontology with the incoming evidence. This algorithm checks for constraints on the ontology before expanding it. If the constraints don't permit the expansion, the support information associated with the incoming evidence and concepts in the ontology are compared. If there is a concept with lesser support compared to the evidence, it will be removed and the incoming evidence will be introduced. An else-if statement is used in the last condition just for clarity. Since the number of concepts in the ontology is three and $N_c$ leq 5 is the only constraint, SatisfyConstraints would return true. Expand function is invoked with $e_1$ and the concept set C.

TABLE 6

Algorithm 4 TryOntologyExpansion(O, $e_j$ , Match( ))

Require: U, $\phi_m$
Ensure: Expand O or Oresidual depending
on the constraints KO or Kresidual.
1: if SatisfyConstraints(O) then
2:   Expand($e_j$ , C)
3: else if SatisfyConstraints(Oresidual) then
4:   Expand($e_j$ , Cresidual)
5: else if ¬ SatisfyConstraints(O) ∧ ¬ SatisfyConstraints(Oresidual)
then
6:   ReadjustOntology(ej , Cresidual ∪C)
7: end if In table 7, Algorithm 5 is responsible for expanding the ontology with new incoming evidences. Constraint checking is done before this method is invoked. In an ontology, there is a hierarchy of relationships. In order to introduce a new concept into an ontology, we need to find where in the ontology does the incoming evidence should be introduced. This involves comparing two concepts and finding which one is more general/specific than the other. Whichever concept that is more specific becomes the child of the more general concept. Upon invocation of this function with e1 and C, where C contains all the concepts in the ontology O as shown in Table 1, the call returns with all the matching concepts present in C. In this specific case the only matching concept is WaterService. Since there is only one concept match, the MostSpecificConcept invocation would just return the same match. specMatch contains the concept WaterService which is compared with evidence e1, WaterTreatmentService. Wa-terTreatmentService is specific compared to WaterService and hence $e_1$ is added as a child of WaterService.

TABLE 7

Algorithm 5 Expand(ej , C)

Require: $\phi_m$
Ensure: expanded ontology $O_{out}$.
1: matches = MatchAndReturnConcepts($e_j$ , C)
//All the concepts that matched the incoming concept
2: specMatch = MostSpecificConcept(matches)
//Choosing lowest concept in the hierarchy for expansion
3: if $e_j$ is specific compared to specMatch then
4: Add ej as a child to specMatch
5: else
6: Add ej as a parent of specMatch
7: end if In table 8, Algorithm 6 is invoked when the ontology constraints are not satisfied for expansion. This algorithm check for concepts that have lesser support information than the incoming evidence, replaces it with the incoming evidence.

TABLE 8

Algorithm 6 ReadjustOntology(ej , C)

Require: $\phi$m
Ensure: readjusted ontology Oout.
1: if $\exists c_i \in C$ | support of $c_i$ < support of $e_j$ then
2: replace $c_i$ by $e_i$ in C
3: end if In table 9, Algorithm 7 is a matching function and this can be any matching function that is suitable for the application in hand.

TABLE 9

Algorithm 7 Match ($w_1$, $w_2$)

// Match function
Require: $w_1$, $w_2$, $\phi_m$
Ensure: boolean
{the distance measure can be any specific algorithm
like for e.g Monge Elken Distance}
1: if distance($w_1$, $w_2$) < $\phi_m$ then
2:   true
3: else
4:   false
5: end if In table 10, Algorithm 8 looks for concepts that were not used upon the processing of evidence by explaining it using concepts from the ontology. The concepts that will be not be used constantly will face a decrement in β value for each evidence set where β is one of the parameters for the beta distribution. This serves as a way of determining which concepts are under utilized thus providing a basis for concept removal from the ontology. Alternatively, a much more sophisticated mechanism can be applied, which is based on how recently the concept was used, and the cost associated with re-learning the concept.

TABLE 10

Algorithm 8 ManageUtilityOfConcepts(U, $E_{incoming}$)

// Concept Utility Manager for quantifying usage of
con- cepts in the Ontology based on the incoming evidence.
Require: Eincoming, Cu, φm
Ensure: ∀ci = <clabel, wterms,ci , s> ∈Cu, and ∀ej =
  <elabel, wterms,ej , s> ∈Eincoming, decrease support s for every
  non-matching concepts with the incoming evidence.
1: for ∀ci ∈Cu and ∀ej ∈Eincoming such that Match
  (elabel,clabel) == 0 do
2: Decrease support s in ci = <clabel, wterms,ci , s>
3: end for In table 11, an example of algorithm 9 is shown. Algorithm 9 is used to move concepts between the ontology and the residual ontology. This is done based on the accumulated evidence and this phase does not involve adding any new concepts. Hence, there is no need to check for constraints on the ontology. This check is already carried out before expanding the ontology in Algorithm 1. After the completion of this algorithm, the total number of concepts in $C_u$ would remain unchanged. $\theta_O$ is the support threshold that is used by the ontology manager to retain concepts in the ontology (O). The concepts with less than this support would be moved to Oresidual if constraints allow this or removed from O.

TABLE 11

Algorithm 9 UpdateOntology(U, $\theta_O$)

//Ontology Manager for updating the ontology
Require: U, $\theta_O$ (threshold support for a concept to stay in the
ontology O)
Ensure: ∀$c_i$ ∈ $C_u$ for which, s ≥ $\theta_O$ make sure that $c_i$ ∈ C and $c_i$
∈/ $C_{residual}$, and for s < $\theta_O$ make sure that $c_i$ ∈ $C_{residual}$ and $c_i$ ∈/ C
1: for every concept $c_i$ = <$c_{label}$, $w_{terms}$,c i , , s> ∈Cu do
2: if s ≥ $\theta_O$ and $c_i$ ∈/ C then
3: $C_{residual}$ = $C_{residual}$ − $c_i$
4: C = C ∪ $c_i$
5: else if s < $\theta_O$ and ci ∈ C then
6: C = C − $c_i$
7: $C_{residual}$ = $C_{residual}$ ∪ $c_i$
8: end if
9: end for The processing of $e_1$ was shown while the algorithms were explained. The rest of the evidences are processed as explained as follows: Processing $e_2$=<WaterTreatment, { }, {α=0, β=0}>, matches WaterTreatmentService. Since the constraints permit the expansion of the ontology $N_c$=4 leq 5, the ontology can be expanded. Since WaterTreatmentService is more specific compared to WaterTreatment, it is added as a child of WaterTreatment concept. Processing $e_3$=<WaterTreatmentPlant, { }, {α=0, β=0}>, matches WaterTreatment. Constraints on O would not allow it's expansion since $N_c$=5 and addition of another concept would violate this constraint, therefore $O_{residual}$ is checked for expansion. Since the constraints on $O_{residual}$ will be satisfied after it's expansion, $e_3$ is added to $O_{residual}$.

After enough evidence is accumulated in support of $e_3$, the ontology manager can then add this concept to the ontology. Processing $e_4$=<WaterBillingService, { }, {α=0, β=0}>, matches WaterService, BuildingService, and LimoService, out of which, only WaterService is relevant to the incoming evidence $e_4$. WaterBillingService is added as a child of WaterService since the first one is specific compared to the second concept. However, since the constraints on O does not allow addition of concepts to O, this concept is added to $O_{residual}$. The ontology manager checks for each concept in $O_{residual}$, to determine if there are any concepts in O whose support is less than the one in $O_{residual}$. If this is the case, it swaps the two concepts. For instance, say WaterTreatmentService has lesser support compared to WaterBillingService. The concept WaterTreatmentService is moved to $O_{residual}$ and WaterBillingService moved to O as a sub Class Of WaterService.

Various options and choices made in terms of the approach are summarized in Table 12. The rationale for choosing one technique over the other would depend on the context in which the implementation is carried out. Support representation in the form of a number is not expressive enough to capture positive and negative evidences along with supporting explanations. Thus, we decided to use a special representation for representing support information. Therefore a number of positive (α) and negative (β) evidences are captured for computing the beta distribution and explanations that led to the current values of α and β.

TABLE 12

Options and choices for implementation

| Quantity support representation (s) | Options number | Choices |
|---|---|---|
|  | special representation with α, β, explanations, etc. | ✓ |
| Matching | Monge Elken Distance | ✓ |
|  | Edit distance |  |
|  | Knowledge base based matching |  |
| Strengthen support | Increment α | ✓ |
|  | decrement β |  |
| Decay of support | Increment β | ✓ |
|  | decrement α |  |
|  | decay α exponentially |  |
| Find Specific Concept | String length | ✓ |
|  | String composition |  |

Evaluation of the ontology evolution process is often performed. The ontology evaluation and evolution is studied extensively in the literature. We borrow the evaluation processes mentioned in [ ]. A new dimension is added to this evaluation by introducing an additional evaluation criterion called the correctness, which can be an important step in the evolution of an ontology. Correctness indicates the precision in arrangement of concepts w.r.t to a concept arrangement generated by humans. The ontology evolved in exemplary embodiments is an ontology that captures various aspects of a city which is system of systems. Specifically, the part of the ontology that captures various departments and services offered by those departments are evolved. Correctness herein refers to the precision of placement of concepts in the ontology. Since the addition of a given concept is verified by inspection, it is semantic correctness that we are looking for in this evaluation. For example, for simplicity the incoming evidence is "WaterBillingService" and the assumption is that the constraints on the ontology will always allow for addition to the ontology. The evolution manager decides to add this as a new concept to the ontology. Once this decision is made by the evolution manager, the position of the concept in the hierarchy is to be computed based on the matching function. The ontology manager implements these changes to the ontology and the evolved ontology.

The matching function needs the thresholds in order to match the incoming evidences to the existing concepts in the ontology. The role of threshold is dual in this approach. First, the threshold is used to find the concepts that are relevant to the incoming evidences. Second, the threshold is used in the ontology expansion phase to place the incoming concepts at an appropriate place in the ontology.

For all the incoming concepts the matching function will match the incoming concepts against all the concepts in the ontology. If there already a concept that matches the evidence, the evidence manager decides to update the support information of the concept. The concept addition is done when there is an evidence that does not closely match but approximately matches some concepts in the ontology. Even if there are many matches between the incoming concept and the concepts in the ontology, the challenge is to find where changes should be made in the ontology. The changes to be made are therefore are guided by constraints on the ontology and the utility of concepts in the ontology.

The evaluation is performed in three different dimensions. In each dimension the precision of the ontology evolution process is evaluated by: (1) changing the threshold of the matching function, (2) changing the matching function, and (3) taking into consideration the related terms for each concept as an input to the matching function.

Figure 4:
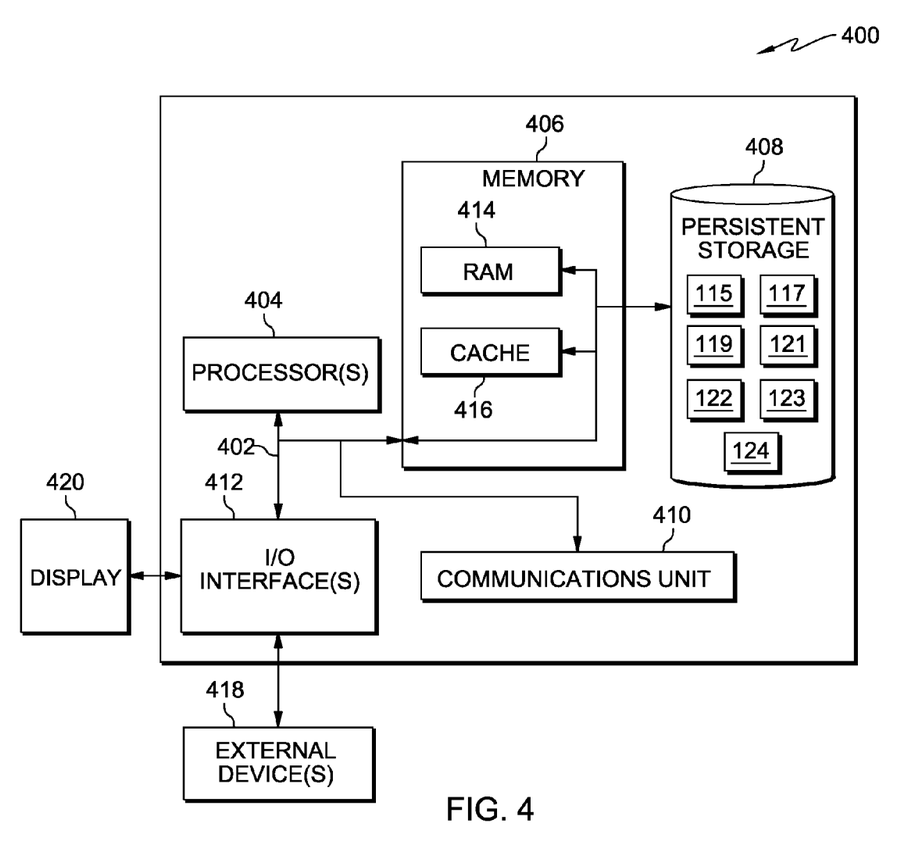
FIG. 4 depicts a block diagram of components of the server computer executing the evidence manager program and the ontology manager program, in accordance with an embodiment of the present invention.

FIG. 4 depicts a block diagram, 400, of respective components of server computer 110 and storage device 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 110 and storage device 120 respectively includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Evidence manager program 115, ontology manager program 117, universal base 119, base data 121, encountered concepts 122, relational data 123, and new evidences 124 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Evidence manager program 115, ontology manager program 117, universal base 119, base data 121, encountered concepts 122, relational data 123, and new evidences 124 may be downloaded to persistent storage 408 through communications unit 410.

I/O interface(s) 412 allows for input and output of data with other devices that may be connected to server computer 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., evidence manager program 115 and ontology manager program 117, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for updating ontology when a set of evidences and a set of constraints are given as inputs, the method comprising:

a computer categorizing one or more new concepts included in a set of evidences into one of three sets, a) a definitely relevant set, b) a possibly relevant set, and c) an irrelevant set, wherein i) concepts included in the definitely relevant set meet or exceed a first categorization threshold, ii) concepts included in the irrelevant set are below a second categorization threshold, and iii) concepts included in the possibly relevant set are (a)

below the first categorization threshold and (b) meet or exceed the second categorization threshold;

the computer adding a categorized new concept included in the definitely relevant set to an first ontology;

the computer adding a categorized new concept included in the possibly relevant set to a residual ontology;

the computer matching one or more new concepts included in the set of evidences to an old concept included in the first ontology or to an old concept included in the residual ontology, wherein an old concept existed as part of the first ontology or the residual ontology before the respective addition of the new concepts to the first ontology or the residual ontology;

the computer determining to increase an associated confidence measure of the old concept, included in the first ontology or the residual ontology, based at least in part, on the matching;

the computer determining to expand the first ontology or the residual ontology by respectively exchanging one or more old concepts between the first ontology and the residual ontology; and the computer removing one or more old concepts from the first ontology or the residual ontology based, at least in part, on a set of constraints, wherein the constraints dictate size and performance requirements of the first ontology.

2. The method of claim 1, the method further comprising:
the computer determining a confidence measure associated with one or more concepts included in the set of evidences, wherein is used as a factor; and
the computer determining whether to add or remove a given concept included in the first ontology or the residual ontology based at least in part, on the confidence measure associated with that concept.

3. The method of claim 2, wherein the set of evidences are filtered based on a confidence threshold such that only evidences from the set of evidences that are above the confidence threshold are stored in either the first ontology or to the residual ontology.

4. The method of claim 1, wherein each of the categorized new concepts and old concepts included in one or both of the first ontology or the residual ontology respectively include a description of the provenance of that concept and a match between that concept and other concepts, wherein each of the concepts are one of either a single term, or a hierarchy of terms in a subsumption relationship.

5. The method of claim 2, the method further comprising:
the computer performing one or more of the following: (i) computing relatedness of an evidence included in the set of evidences to the old concepts included in the first ontology; (ii) combining relatedness scores of various techniques into a single confidence measure; (iii) determining to expand a knowledge base of a residual ontology based, at least in part, on a type of the evidence included in the set of evidences; and (iv) decaying the confidence measure associated with an unused concept that is included in the first ontology.

6. The method of claim 2, the method further comprising:
the computer removing concepts from one or both of the first ontology or residual ontology to accommodate new concepts with greater confidence measures.

7. The method of claim 1, the method further comprising:
the computer determining a weighted value for one or more techniques of evidence accumulation, wherein the one or more techniques of evidence accumulation are used to generate sets of evidences; and the computer redistributing one or more weighted values among two or more different techniques of evidence accumulation.

8. The method of claim 1, the method further comprising:
the computer determining a cost associated with adding a concept to either the first ontology or the residual ontology; and
the computer using the determined cost as a factor when determining whether to remove a concept from the residual ontology, wherein a concept that is removed from the residual ontology is not added to the first ontology.

9. The method of claim 1, the method further comprising:
the computer determining an evolutionary process of the first ontology using beta distribution functions, wherein determined values of the beta distribution are either a positive or a negative evidence towards a concept already present in the first ontology.

10. The method of claim 1, the method further comprising:
the computer determining a support strength for a concept included in the first ontology, wherein the support strength is computed based on the incoming evidences, and is updated during a processing of those incoming evidences, wherein the incoming evidences are in the form of concepts and associated terms with their respective support strengths, which are used to update the concepts in the first ontology based on accumulated support strength for a given concept included in the first ontology.

11. A computer program product for updating ontology when a set of evidences and a set of constraints are given as inputs, the computer program product comprising:
one or more computer-readable storage media and program instructions stored on the one or more computer-readable storage media, the program instructions comprising:
program instructions to categorize one or more new concepts included in a set of evidences into one of three sets, a) a definitely relevant set, b) a possibly relevant set, and c) an irrelevant set, wherein i) concepts included in the definitely relevant set meet or exceed a first categorization threshold, ii) concepts included in the irrelevant set are below a second categorization threshold, and iii) concepts included in the possibly relevant set are (a) below the first categorization threshold and (b) meet or exceed the second categorization threshold;
program instructions to add a categorized new concept included in the definitely relevant set to an first ontology;
program instructions to add a categorized new concept included in the possibly relevant set to a residual ontology;
program instructions to match one or more new concepts included in the set of evidences to an old concept included in the first ontology or to an old concept included in the residual ontology, wherein an old concept existed as part of the first ontology or the residual ontology before the respective addition of the new concepts to the first ontology or the residual ontology;
program instructions to determine to increase an associated confidence measure of the old concept, included in the first ontology or the residual ontology, based at least in part, on the matching;

program instructions to determine to expand the first ontology or the residual ontology by respectively exchanging one or more old concepts between the first ontology and the residual ontology; and program instructions to remove one or more old concepts from the first ontology or the residual ontology based, at least in part, on a set of constraints, wherein the constraints dictate size and performance requirements of the first ontology.

12. The computer program product of claim 11, the program instructions further comprising:

program instructions to determine a confidence measure associated with one or more concepts included in the set of evidences, wherein is used as a factor; and program instructions to determine whether to add or remove a given concept included in the first ontology or the residual ontology based at least in part, on the confidence measure associated with that concept.

13. The computer program product of claim 12, wherein the set of evidences are filtered based on a confidence threshold such that only evidences from the set of evidences that are above the confidence threshold are stored in either the first ontology or to the residual ontology.

14. The computer program product of claim 11, wherein each of the categorized new concepts and old concepts included in one or both of the first ontology or the residual ontology respectively include a description of the provenance of that concept and a match between that concept and other concepts, wherein each of the concepts are one of either a single term, or a hierarchy of terms in a subsumption relationship.

15. The computer program product of claim 12, the program instructions further comprising:

program instructions to perform one or more of the following: (i) compute relatedness of an evidence included in the set of evidences to the old concepts included in the first ontology; (ii) combine relatedness scores of various techniques into a single confidence measure; (iii) determine to expand a knowledge base of a residual ontology based, at least in part, on a type of the evidence included in the set of evidences; and (iv) decay the confidence measure associated with an unused concept that is included in the first ontology.

16. The computer program product of claim 12, the program instructions further comprising:

program instructions to remove concepts from one or both of the first ontology or residual ontology to accommodate new concepts with greater confidence measures.

17. The computer program product of claim 11, the program instructions further comprising:

program instructions to determine a weighted value for one or more techniques of evidence accumulation, wherein the one or more techniques of evidence accumulation are used to generate sets of evidences; and program instructions to redistribute one or more weighted values among two or more different techniques of evidence accumulation.

18. The computer program product of claim 11, the program instructions further comprising:

program instructions to determine a cost associated with adding a concept to either the first ontology or the residual ontology; and program instructions to use the determined cost as a factor when determining whether to remove a concept from the residual ontology, wherein a concept that is removed from the residual ontology is not added to the first ontology.

19. The computer program product of claim 11, the program instructions further comprising:

program instructions to determine an evolutionary process of the first ontology using beta distribution functions, wherein determined values of the beta distribution are either a positive or a negative evidence towards a concept already present in the first ontology.

20. The computer program product of claim 11, the program instructions further comprising:

program instructions to determine a support strength for a concept included in the first ontology, wherein the support strength is computed based on the incoming evidences, and is updated during a processing of those incoming evidences, wherein the incoming evidences are in the form of concepts and associated terms with their respective support strengths, which are used to update the concepts in the first ontology based on accumulated support strength for a given concept included in the first ontology.

* * * * *